B. P. CRANDALL.

Child's Carriage.

No. 3,971. Reissued May 17, 1870.

Witnesses:
Azipto Rock
Geo W Rothwell

Inventor:
Benj P. Crandall
by John A. Wiedersheim
Atty.

N. PETERS, PHOTO-LITHOGRAPHER, WASHINGTON, D. C.

United States Patent Office.

BENJAMIN P. CRANDALL, WILLIAM E. CRANDALL, AND CHARLES T. CRANDALL, OF NEW YORK, N. Y., ASSIGNEES OF BENJAMIN P. CRANDALL.

*Letters Patent No.* 98,351, *dated December* 28, 1869; *reissue No.* 3,971, *dated May* 17, 1870.

IMPROVEMENT IN CHILDREN'S CARRIAGES.

The Schedule referred to in these Letters Patent and making part of the same.

*To all whom it may concern:*

Be it known that I, BENJAMIN P. CRANDALL, of the city, county, and State of New York, have invented a new and useful Improvement in Children's Carriages; and I do hereby declare that the following is a full, clear, and exact description thereof, sufficient to enable others skilled in the art to which my invention appertains to make and use the same, reference being had to the accompanying drawings forming part of this specification, in which—

Figure 1:
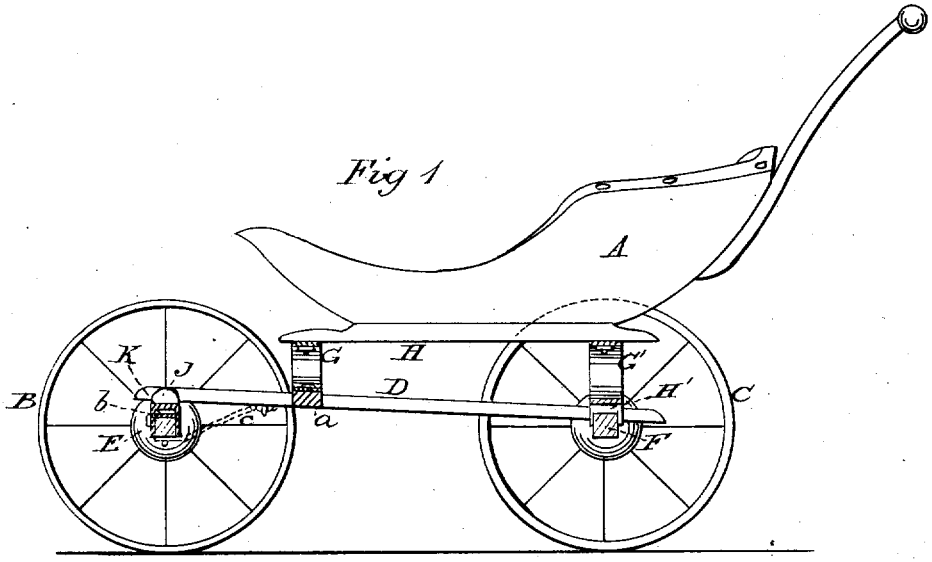
Figure 2:
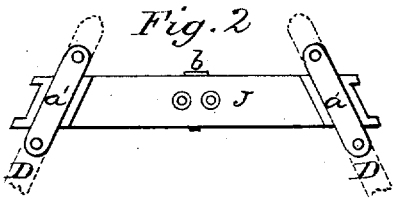

Figure 1 is a side view of a carriage, the lower portion being in section, as illustrative of my invention.

Figures 2, 3, 4, and 5, are views of detached parts, to be hereinafter referred to.

Similar letters of reference indicate corresponding parts in the several figures.

My invention consists—

First, in so pivoting the front axles that the wheels thereof will conform to the inequalities of the road, and, by means of a suitable spring, said axle will always be kept steady and square.

Second, in supporting the body of the carriage upon springs placed transversely upon perches between the rear and front wheels.

In the drawings—

A may represent the body of the carriage.

B, the front wheels.

C, the hind wheels; and

D, the reaches which connect the front and rear axles E F.

All of which parts may be of general form and construction.

Figure 4:
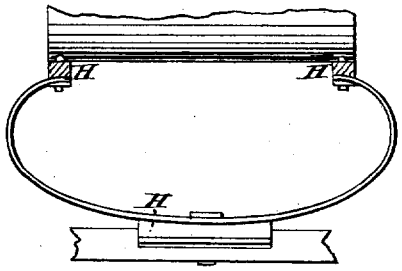
Figure 3:
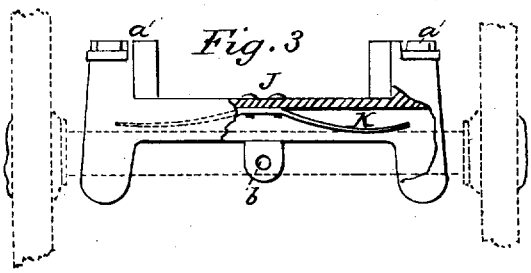
Figure 5:
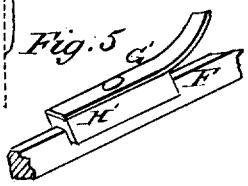

G G′ represents the springs, which are of elliptic form, as seen in fig. 4.

The ends of these springs are secured to longitudinal supports H, which are connected to the sides or bottom of the body A, or they may be secured directly to the said body, if it be desired.

The crown or center of the front spring G rests on a cross-piece, *a*, which is supported on the reaches D, or may rest directly on the reaches.

The rear spring G′ rests on a casting, H′, which is made forked, so as to straddle the rear axle.

A bolt or pin passes through the crown of the spring G′, the casting H′, and the rear axle, and thereby secures the spring in place without the employment of the ordinary clips.

J represents a casting or block of wood, which is pivoted to the front axle. It is constructed to straddle said axle transversely, and has formed on its upper side grooves or spaces *a*′, which fit or rest on the forward ends of the reaches D.

The pivot *b* passes through the piece J and the axle, and allows the axle to vibrate in a vertical plane, and consequently permits of a similar movement of the front wheels.

It will be seen that, in using the perambulator, the front wheels are permitted to conform to the inequalities of the pavement, streets, or roads on which they may travel, and yet are kept directly to the front.

I arrange a spring, K, within the piece J, and connect it thereto, or to the reaches D, so that its two ends are free to point in opposite directions and bear against the front axle.

It will be seen that all shocks or jars on the front wheels are received by the spring K, and prevented from reaching the body A. The spring also keeps the axle square. This is desirable in crossing gutters, holes, or ruts.

In such cases the front wheels and corresponding parts of the carriage are lifted bodily from the ground. When they are returned, the wheels are caused to strike the ground fairly and squarely, and without any shocks or jars.

The casting or block J may be dispensed with, and in lieu thereof I can employ bars *c*, shown in dotted lines, fig. 1. These bars are pivoted to the reaches and the front axle, and are adapted to allow the oscillation of the axle in a manner similar to that already described.

Other devices may be employed for the same purpose, the object in all cases being to admit the axle to oscillate in a vertical plane, in order to cause its wheels to conform to the inequalities of the ground, and thereby retain the body of the carriage in a more horizontal position than it assumes when the axle is rigid.

The spring K is auxiliary to the springs G G′. It not only keeps the front axle square, but assists the other springs to prevent shocks and jars reaching the body of the carriage.

What I claim as new, and desire to secure by Let-Letters Patent, is—

1. In a child's carriage, the combination with the bearing to which the reach is immovably secured, of the front axle, pivoted to said bearing, substantially as and for the purpose described.

2. The casting J, constructed to support the reaches, and form the bearings for the front axle, and guides for its oscillations, and receiving the spring which bears against said axle, substantially as described.

3. In a child's carriage, the spring G, arranged upon perches, which connect together the rear and front axles, carrying the rear and front wheels B and C, substantially as described.

4. In a child's carriage, the two perches D D, supporting the body of the carriage, resting in front on a bearing, to which the front axle is secured.

5. The forked casting H, constructed as herein shown and described.

6. A child's carriage, constructed as herein shown and described, that is to say, consisting of a body, A, provided with a handle, said body supported upon springs G G', the former secured to the perches D D, the latter upon the axle, in connection with the two rear wheels arranged on the outside of the body, and the two front wheels arranged within lines of the rear wheels, substantially as described.

The above signed by me this 2d day of May, 1870.

B. P. CRANDALL.

Witnesses:

B. B. CHAPPEL,

WM. COMPTON.